US012050430B2

(12) United States Patent
Nitta et al.

(10) Patent No.: US 12,050,430 B2
(45) Date of Patent: Jul. 30, 2024

(54) IMAGE FORMING APPARATUS

(71) Applicant: CANON KABUSHIKI KAISHA, Tokyo (JP)

(72) Inventors: Jumpei Nitta, Kanagawa (JP); Tomoya Tateishi, Kanagawa (JP); Akinori Mitsumata, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/073,755

(22) Filed: Dec. 2, 2022

(65) Prior Publication Data

US 2023/0195023 A1 Jun. 22, 2023

(30) Foreign Application Priority Data

Dec. 20, 2021 (JP) ................................ 2021-205729

(51) Int. Cl.
*G03G 21/16* (2006.01)

(52) U.S. Cl.
CPC ..... *G03G 21/1619* (2013.01); *G03G 21/1638* (2013.01); *G03G 2215/00544* (2013.01); *G03G 2215/00675* (2013.01); *G03G 2221/1684* (2013.01)

(58) Field of Classification Search
CPC ........... G03G 15/6529; G03G 15/6555; G03G 15/6558; G03G 15/6561; G03G 15/657; G03G 21/1619; G03G 21/1623; G03G 21/1638; G03G 2215/0544; G03G 2215/00675; G03G 2221/1678; G03G 2221/1684; G03G 2221/1687
See application file for complete search history.

(56) References Cited

U.S. PATENT DOCUMENTS 7,448,621 B2 * 11/2008 Yasumoto .......... G03G 15/6529 271/264
7,663,658 B2 * 2/2010 Murano ................. G03G 15/75 347/245
8,923,746 B2 * 12/2014 Nakamura ............... B65H 5/26 399/121
9,798,285 B1 * 10/2017 Guerand ............ G03G 21/1638
10,386,781 B2 * 8/2019 Shima .................. G03G 15/161
2020/0393788 A1 * 12/2020 Okamoto ........... G03G 21/1695

FOREIGN PATENT DOCUMENTS

JP 2019095802 A 6/2019

* cited by examiner

*Primary Examiner* — Justin N Olamit
(74) *Attorney, Agent, or Firm* — ROSSI, KIMMS & McDOWELL LLP

(57) ABSTRACT

An image forming apparatus includes a first roller, a second roller arranged downstream of the first roller in a sheet conveyance direction, the second roller including a rotation shaft and a roller body supported by the rotation shaft, a third roller arranged downstream of the second roller in the sheet conveyance direction, a first support member configured to rotatably support the first roller, a second support member configured to rotatably support the third roller, and a bearing member configured to rotatably support an end portion of the rotation shaft. The bearing member includes a first positioning portion configured to position an end portion of the first support member and a second positioning portion configured to position an end portion of the second support member.

18 Claims, 11 Drawing Sheets

IMAGE FORMING APPARATUS

BACKGROUND OF THE INVENTION

Field of the Invention

The present invention relates to an image forming apparatus that forms an image on a sheet.

Description of the Related Art

An image forming apparatus such as a printer and a multifunction peripheral forms an image on a sheet used as a recording material while sequentially delivering and conveying the sheet between a plurality of conveyance rollers. JP 2019-095802 A discloses an image forming apparatus that forms an image on a sheet while sequentially delivering the sheet set on a sheet feed tray by a pickup roller, a feed roller, a registration roller, a transfer roller, and a sheet discharge roller.

In the image forming apparatus, in a case where relative alignment accuracy between the plurality of rollers is low, the sheet being conveyed may be skewed.

SUMMARY OF THE INVENTION

The present invention provides an image forming apparatus capable of improving relative alignment accuracy between rollers.

According to one aspect of the invention, an image forming apparatus includes a first roller configured to convey a sheet, a second roller arranged downstream of the first roller in a sheet conveyance direction and configured to convey the sheet, the second roller including a rotation shaft and a roller body supported by the rotation shaft, a third roller arranged downstream of the second roller in the sheet conveyance direction and configured to convey the sheet, a first support member configured to rotatably support the first roller, a second support member configured to rotatably support the third roller, and a bearing member configured to rotatably support an end portion of the rotation shaft in a rotational axis direction of the second roller, wherein the bearing member includes a first positioning portion configured to position an end portion of the first support member in the rotational axis direction with respect to a direction orthogonal to the rotational axis direction and a second positioning portion configured to position an end portion of the second support member in the rotational axis direction with respect to a direction orthogonal to the rotational axis direction.

Further features of the present invention will become apparent from the following description of exemplary embodiments with reference to the attached drawings.

DESCRIPTION OF THE EMBODIMENTS

Hereinafter, an embodiment according to the present disclosure will be described with reference to the drawings.

Figure 1:
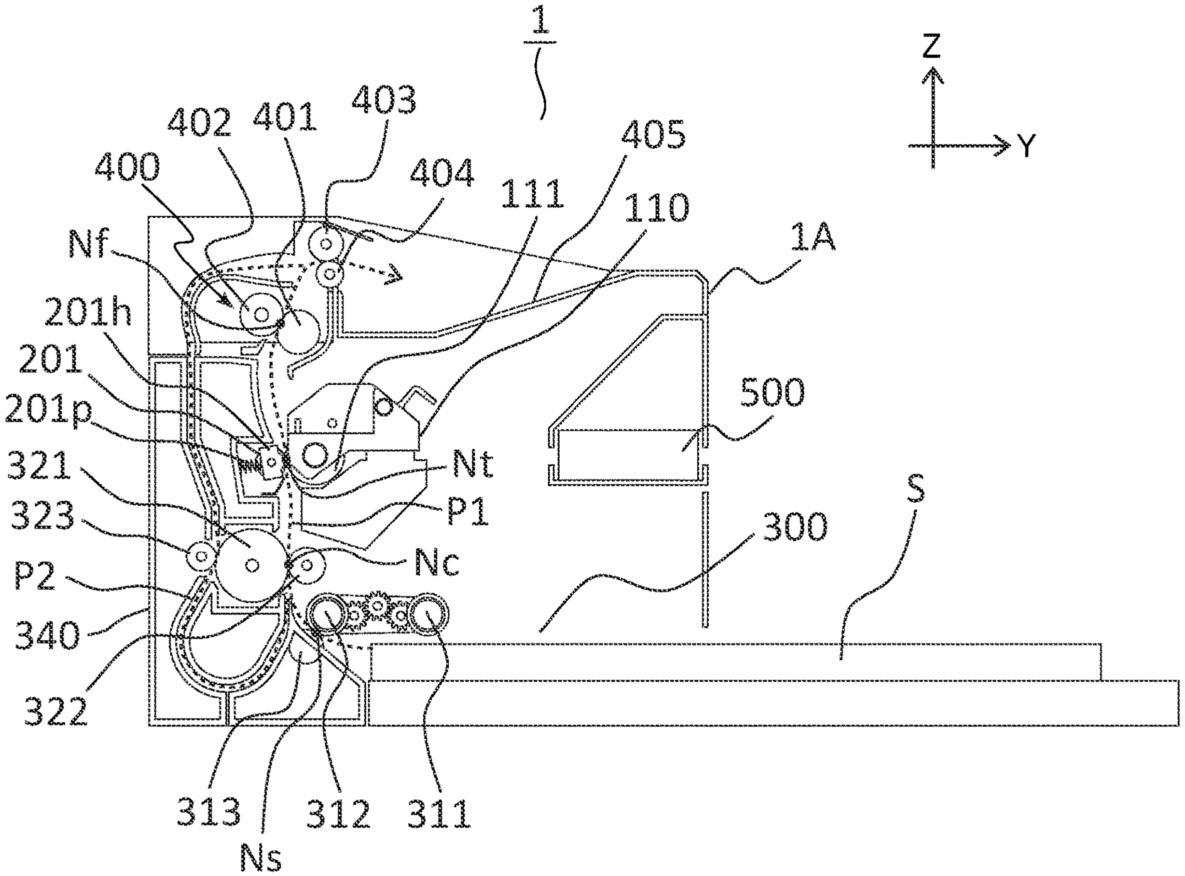
FIG. 1 is a schematic diagram of an image forming apparatus according to an embodiment of the present disclosure.

FIG. 1 is a schematic diagram of an image forming apparatus 1 according to the present embodiment. The image forming apparatus 1 is a monochrome printer that forms a monochromatic image on a sheet S serving as a recording material by using an image forming unit while conveying the sheet S. The sheet S may be various sheet materials having different sizes and materials, such as paper including plain paper and thick paper, a plastic film, cloth, a sheet material subjected to surface treatment such as a coated paper, and a sheet material having a special shape such as an envelope and index paper.

The image forming apparatus 1 includes an electrophotographic image forming unit 1B including a process unit 110, a laser scanner unit 500, a transfer roller 201, and a fixing unit 400. The process unit 110 includes a photosensitive drum 111 serving as an image bearing member and one or more process members that act on the photosensitive drum 111. The process unit 110 is configured as a cartridge detachable from an apparatus body 1A (casing) of the image forming apparatus 1.

The image forming apparatus 1 includes a pickup roller 311, a feed roller 312, a separation roller 313, a conveyance roller 321, counter conveyance rollers 322 and 323, a sheet discharge roller 403, and a counter sheet discharge roller 404 as a mechanism for conveying the sheet S. A sheet storage portion 300 (sheet tray) for stacking and storing the sheets S is provided in a lower portion of the apparatus body 1A. A sheet discharge tray 405 for stacking the sheet S on which an image has been formed is provided in an upper surface portion of the apparatus body 1A.

When an instruction to form an image (print job) is input to the image forming apparatus 1, formation of a toner image is started in the image forming unit 1B. That is, the photosensitive drum 111 rotates in the process unit 110, and a charger uniformly charges a surface of the photosensitive drum 111. The laser scanner unit 500 irradiates the photosensitive drum 111 with a laser beam on the basis of image information included in the print job. Thus, the charged surface of the photosensitive drum 111 is exposed, and an electrostatic latent image corresponding to the image information is written. A developing unit of the process unit 110 supplies a developer containing toner to the photosensitive drum 111 and visualizes (develops) the electrostatic latent image as a toner image. The toner image is conveyed, by rotation of the photosensitive drum 111, to a transfer nip Nt that is a nip portion between the photosensitive drum 111 and the transfer roller 201.

In parallel with the above toner image forming process, the sheets S are supplied one by one from the sheet storage portion 300 to the image forming unit 1B. That is, the pickup roller 311 comes into contact with an uppermost sheet of the sheets S stacked on the sheet storage portion 300 and rotates, thereby feeding the sheet S from the sheet storage portion 300. The sheet S fed from the sheet storage portion 300 is further conveyed while being separated one by one at a nip portion (separation nip Ns) between the feed roller 312 and the separation roller 313. The sheet S passed through the separation nip Ns is nipped at a conveyance nip Nc between the conveyance roller 321 and the counter conveyance rollers 322 and is further conveyed toward a transfer nip Nt.

The separation roller 313 is an example of a separation member that separates the sheet S by frictional force. The separation roller 313 can be, for example, a rubber roller supported by a shaft fixed to a frame body of the apparatus body 1A via a torque limiter. In addition, the separation member may be a retard roller to which driving force in a direction against a moving direction of a peripheral surface of the feed roller 312 at the separation nip Ns is input via the torque limiter, or a pad-shaped elastic member that comes into contact with the feed roller 312.

At the transfer nip Nt, by a predetermined bias voltage (transfer voltage) being applied to the transfer roller 201, the toner image is transferred from the photosensitive drum 111 to the sheet S. The sheet S to which the toner image has been transferred is subject to fixing process in the fixing unit 400. The fixing unit 400 has a heat fixing configuration including a first rotary member and a second rotary member that convey the sheet S while nipping the sheet S at a fixing nip Nf and a heating unit that heats the image on the sheet S. The first rotary member is, for example, a flexible tubular film or roller. The second rotary member is, for example, a roller having an elastic layer on its outer peripheral portion. The heating unit can be a heater board in which a pattern of a heating resistor formed on a ceramic substrate, or a halogen lamp that emits radiant heat.

The sheet S passed through the fixing nip Nf is discharged to the outside of the apparatus body 1A by a sheet discharge roller pair including the sheet discharge roller 403 and the counter sheet discharge roller 404 and is stacked on the sheet discharge tray 405. The above path from the sheet storage portion 300 to the sheet discharge tray 405 via the plurality of rollers is a first conveyance path P1 (main conveyance path) of the image forming apparatus 1.

In order to form images on both surfaces of the sheet S, the sheet S having a first surface on which the image has been formed by the above image forming operation is fed to a second conveyance path P2 (duplex conveyance path, re-conveyance path) by reverse conveyance by the sheet discharge roller pair. The second conveyance path P2 is a conveyance path that branches from the first conveyance path P1 at a part downstream of the fixing nip Nf in a sheet conveyance direction of the first conveyance path P1 and joins the first conveyance path P1 at a part upstream of the separation nip Ns between the conveyance roller 321 and the counter conveyance rollers 322. The sheet S fed to the second conveyance path P2 is conveyed while being nipped between the conveyance roller 321 and the counter conveyance roller 323 and is conveyed to the first conveyance path P1 again. Then, an image is formed on a second surface opposite to the first surface while the sheet S is passing through the transfer nip Nt and the fixing nip Nf, and thereafter the sheet S is discharged by the sheet discharge roller pair.

Rollers and Guide Members

Rollers and guide members included in the image forming apparatus 1 will be described with reference to FIGS. 2 to 10.

In the following description, a rotational axis direction of the photosensitive drum 111 is defined as an X-axis direction. A vertical direction (a direction opposite to a direction of gravity) when the image forming apparatus 1 is installed on a horizontal plane is defined as a Z-axis direction. A direction orthogonal to the X-axis direction and the Z-axis direction is defined as a Y-axis direction. The X-axis direction is preferably orthogonal to the Z-axis direction. The X-axis direction is also a sheet width direction (a direction orthogonal to the sheet conveyance direction) of the sheet conveyed in the first conveyance path P1 and the second conveyance path P2.

Figure 2:
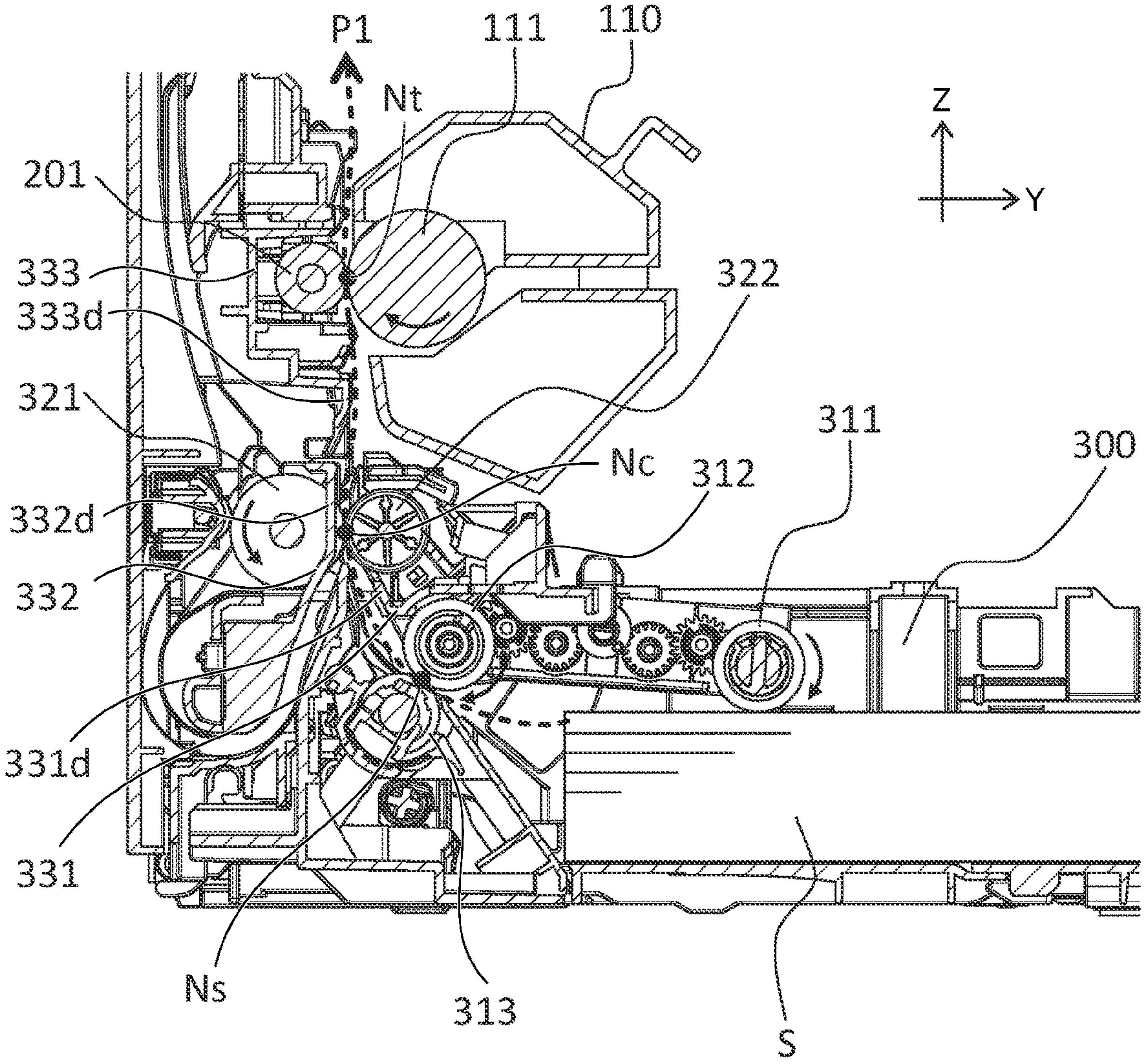
FIG. 2 is a cross-sectional view illustrating a part of the image forming apparatus according to the embodiment.

FIG. 2 is a cross-sectional view of a part of the image forming apparatus 1, which is taken along a plane perpendicular to the X-axis direction. FIG. 2 illustrates arrangement of the rollers and guide members arranged in a part from the sheet storage portion 300 to the transfer roller 201 in the first conveyance path P1.

As illustrated in FIG. 2, the pickup roller 311, the feed roller 312, the separation roller 313, the conveyance roller 321, the counter conveyance rollers 322, the photosensitive drum 111, and the transfer roller 201 are arranged along the first conveyance path P1. The separation nip Ns formed by the feed roller 312 and the separation roller 313 is located downstream of the pickup roller 311 in the sheet conveyance direction in the first conveyance path P1. The conveyance nip Nc formed by the conveyance roller 321 and the counter conveyance rollers 322 is located downstream of the separation nip Ns. The transfer nip Nt formed by the photosensitive drum 111 and the transfer roller 201 is located downstream of the conveyance nip Nc.

The feed roller 312 is an example of a first roller that conveys a sheet. The conveyance roller 321 is an example of a second roller that includes a rotation shaft and a roller body supported by the rotation shaft, is arranged downstream of the first roller in the sheet conveyance direction, and conveys the sheet. The transfer roller 201 is an example of a third roller that is arranged downstream of the second roller in the sheet conveyance direction and conveys the sheet. The second conveyance rollers 322 are each an example of a fourth roller that comes into contact with the second roller and nips and conveys the sheet together with the second roller. Note that the first to fourth rollers are not limited to the examples described herein and may be roller members that convey a sheet at other positions in the image forming apparatus.

The pickup roller 311, the feed roller 312, and the photosensitive drum 111 are to be brought into contact with the first surface of the sheet S fed from the sheet storage portion 300. The separation roller 313, the conveyance roller 321, and the transfer roller 201 are to be brought into contact with the second surface of the sheet S fed from the sheet storage portion 300.

The pickup roller 311, the feed roller 312, and the photosensitive drum 111 are each rotationally driven in a clockwise direction in FIG. 2 by driving force transmitted from a motor serving as a driving source. The conveyance roller 321 is rotationally driven in a counterclockwise direction in FIG. 2 by the driving force transmitted from the motor. The transfer roller 201 and the counter conveyance rollers 322 can be rotated by force received from their opposing rollers or may be rotationally driven by the driving force transmitted from the driving source.

As illustrated in FIG. 2, a first conveyance guide 331, a second conveyance guide 332, and a third conveyance guide 333 are arranged along the first conveyance path P1. The first conveyance guide 331 guides the sheet S between the separation nip Ns and the conveyance nip Nc and in the vicinity of the counter conveyance rollers 322. The second conveyance guide 332 guides the sheet S in a part of the second conveyance path P2 and in the vicinity of the conveyance roller 321. The third conveyance guide 333 is arranged downstream of the second conveyance guide 332 in the sheet conveyance direction in the first conveyance path P1 and guides the sheet S between the conveyance nip Nc and the transfer nip Nt and around the transfer roller 201.

A part of the first conveyance guide 331 and a part of the second conveyance guide 332 face each other across the first conveyance path P1 (i.e., with the first conveyance path P1 being interposed between them) in the vicinity of the conveyance nip Nc. The first conveyance guide 331 and the second conveyance guide 332 can guide the sheet S fed from the sheet storage portion 300 to the conveyance nip Nc. The third conveyance guide 333 can guide the sheet having passed through the conveyance nip Nc to the transfer nip Nt. The first conveyance guide 331 guides the first surface of the sheet S fed from the sheet storage portion 300. The second conveyance guide 332 and the third conveyance guide 333 guide the second surface of the sheet S fed from the sheet storage portion 300.

The first conveyance guide 331 is an example of a first support member that rotatably supports the first roller. The third conveyance guide 333 is an example of a second support member that rotatably supports the third roller.

Outline of Support Configuration

Figure 3:
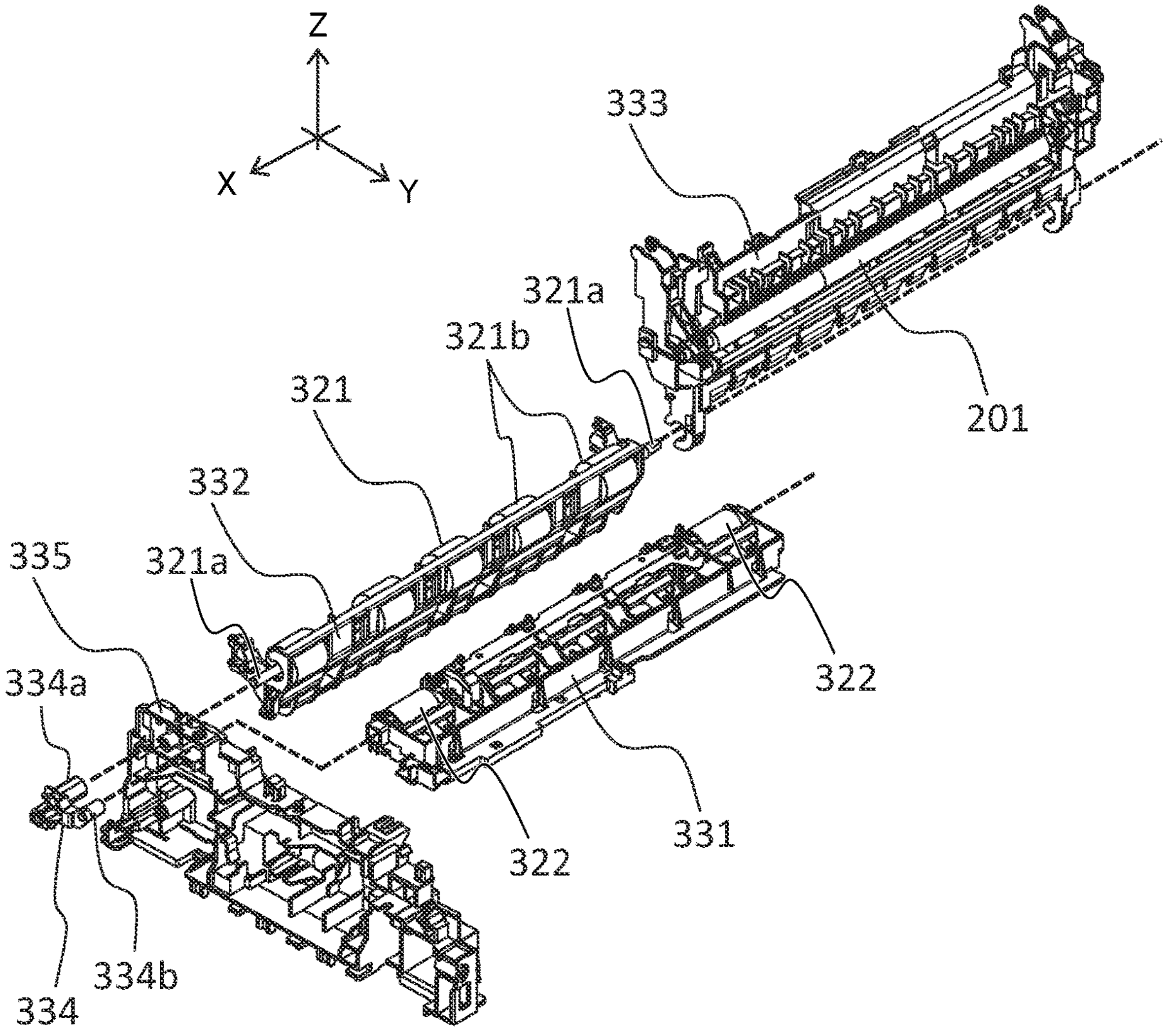
FIG. 3 is a schematic diagram illustrating a support configuration of rollers and guide members according to the embodiment.

FIG. 3 is a schematic diagram (exploded diagram) illustrating a support configuration of the first conveyance guide 331, the second conveyance guide 332, and the third conveyance guide 333. In the present embodiment, a bearing member 334 rotatably supporting the conveyance roller 321 supports the first conveyance guide 331, the second conveyance guide 332, and the third conveyance guide 333. The first conveyance guide 331 supports the feed roller 312 and the counter conveyance rollers 322. The third conveyance guide 333 supports the transfer roller 201. As described below, the first conveyance guide 331 and the third conveyance guide 333 are positioned by the bearing member 334, thereby determining positions of the feed roller 312 and the transfer roller 201 with respect to the conveyance roller 321.

In the present embodiment, the support configuration of each conveyance guide and the conveyance roller 321 is substantially the same on both sides in the X-axis direction (a rotational axis direction of the conveyance roller 321). In the following description, the support configuration on one side in the X-axis direction will be described, but a corresponding support configuration is also provided on the opposite side in the X-axis direction. For example, in addition to the bearing member 334 and the frame 335 in FIG. 3, one bearing member (second bearing member) and one frame (second frame) having the same configuration as the bearing member 334 and the frame 335 in a symmetrical shape are arranged on the opposite side in the X-axis direction.

Support Configuration of Conveyance Roller

Figure 4:
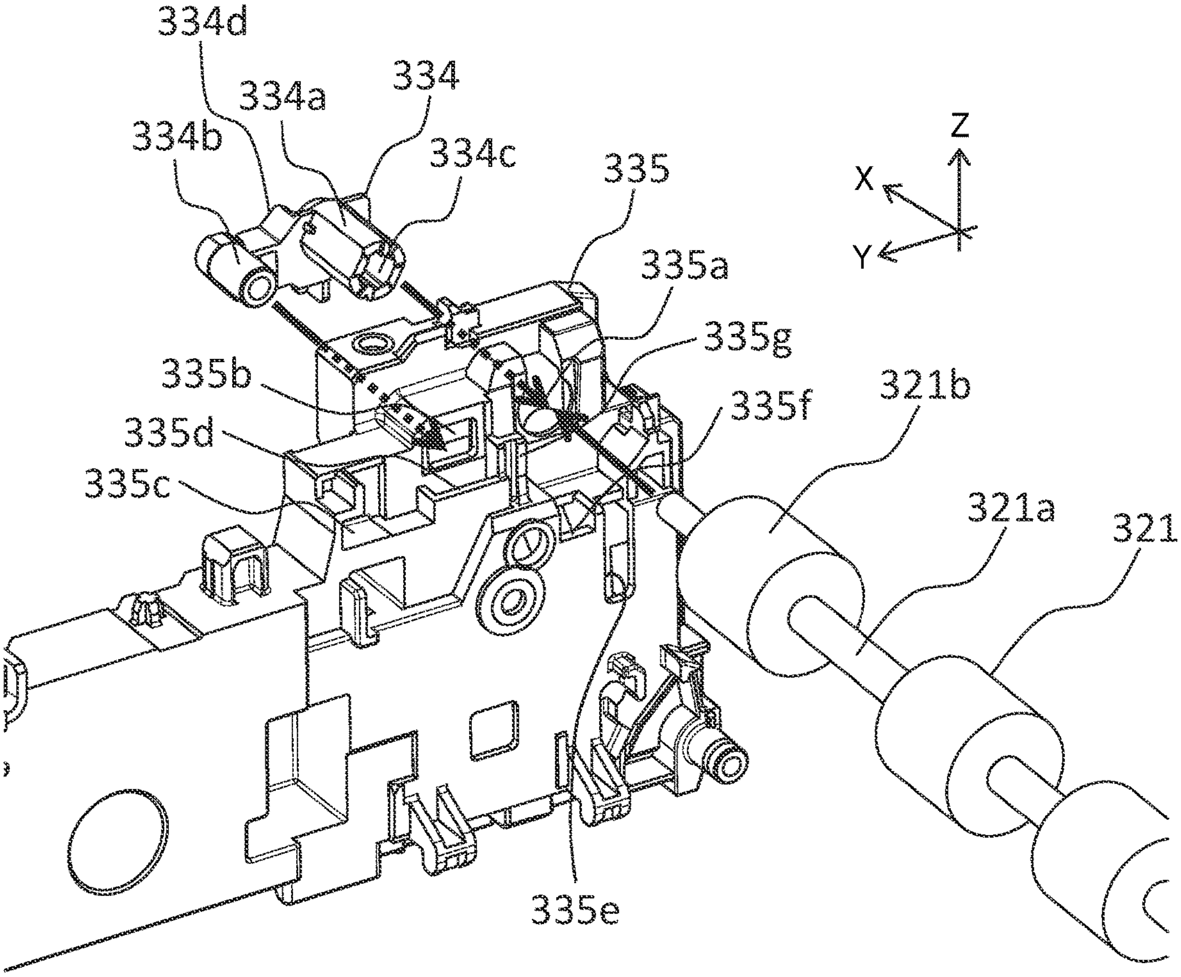
FIG. 4 is a perspective view illustrating a support configuration of a conveyance roller according to the embodiment.

The support configuration of the conveyance roller 321 will be described with reference to FIG. 4. FIG. 4 is a perspective view illustrating the support configuration of the conveyance roller 321.

As illustrated in FIG. 4, the bearing member 334 has a first boss 334*b*, a second boss 334*a*, a hole 334*c*, and a connecting portion 334*d*. The first boss 334*b* is a first positioning portion of the present embodiment, and the second boss 334*a* is a second positioning portion and a third positioning portion of the present embodiment.

Both the first boss 334*b* and the second boss 334*a* are projections extending in the X-axis direction and have an arc surface (cylindrical surface) extending in the X-axis direction. The hole 334*c* is formed inside the second boss 334*a* and extends in the X-axis direction. The second boss 334*a* and the first boss 334*b* are arranged to have a space in a direction intersecting the X-axis direction and are integrally formed via the connecting portion 334*d*. The second boss 334*a* and the hole 334*c* are coaxially arranged (on a rotational axis of the conveyance roller 321). The bearing member 334 is supported by the frame 335.

The frame 335 has a hole 335*a*, a rectangular hole 335*b*, a first groove 335*c*, a first rib 335*d*, a second groove 335*e*, a second rib 335*f*, and a third rib 335*g*. Both the hole 335*a* and the rectangular hole 335*b* are through holes penetrating the frame 335 from the outside to the inside thereof in the X-axis direction. The first groove 335*c* and the second groove 335*e* have a groove shape provided on an inner side surface of the frame 335 in the X-axis direction. The first rib 335*d* and the second rib 335*f* have a plate shape extending in the direction intersecting the X-axis direction (preferably, the Y-axis direction and the Z-axis direction). The frame 335 is fixed to the frame body of the apparatus body 1A.

The frame 335 is an example of a restriction member or regulation member that restricts/regulates rotation or positions of the first support member and the second support member. The first groove 335*c* is an example of a first rotation restriction portion that restricts the rotation of the first support member. The second groove 335*e* is an example of a second rotation restriction portion that restricts the rotation of the second support member. The first rib 335*d* is an example of a first position regulation portion that regulates the position of the first support member in the X-axis direction (the rotational axis direction of the second roller). The third rib 335*g* is an example of a second position regulation portion that regulates the position of the second support member in the X-axis direction.

The second boss 334*a* of the bearing member 334 is engaged with (fitted into) the hole 335*a* of the frame 335, and the first boss 334*b* of the bearing member 334 is engaged with (fitted into) the rectangular hole 335*b* of the frame 335. Thus, a position and posture of the bearing member 334 are regulated. The hole 335*a* of the frame 335 is an example of a first engagement portion that is engaged with the second boss 334*a* of the bearing member 334 to position the bearing member 334 in a direction orthogonal to the X-axis direction. The rectangular hole 335*b* of the frame 335 is an example of a second engagement portion that is engaged with the first boss 334*b* of the bearing member 334 to restrict rotation of the bearing member 334 when viewed in the X-axis direction.

The first conveyance guide 331, the second conveyance guide 332, the third conveyance guide 333, the feed roller 312, the conveyance roller 321, and the transfer roller 201 are arranged such that at least part thereof is located on one side of the frame 335 in the X-axis direction. The bearing member 334 is attached to the frame 335 from the other side of the frame 335 and is arranged such that at least a part thereof is located on the other side of the frame 335. The second boss 334*a* and the first boss 334*b* of the bearing member 334 penetrate the frame 335 from the other side to the one side of the frame 335 through the hole 335*a* and the rectangular hole 335*b* of the frame 335.

That is, the bearing member 334 is positioned with the second boss 334*a* serving as a positioning center (reference) in at least one direction orthogonal to the X-axis direction by the engagement between the second boss 334*a* and the hole 335*a*. The second boss 334*a* and the hole 335*a* restrict movement of the bearing member 334 with respect to the frame 335 in at least one of the Y-axis direction and the Z-axis direction, preferably in any arbitrary direction orthogonal to the X-axis direction. An inner diameter of the hole 335*a* is set to be equal to an outer diameter of the second boss 334*a* or to be slightly larger than the outer diameter of the second boss 334*a* in consideration of tolerance.

The engagement between the first boss 334*b* and the rectangular hole 335*b* restricts rotation (change in posture) of the bearing member 334 about the second boss 334*a*. That is, even if the bearing member 334 attempts to rotate about the second boss 334*a*, the first boss 334*b* interferes with a lower surface or upper surface of the rectangular hole 335*b*. Thus, the bearing member 334 does not rotate. A width of the rectangular hole 335*b* in the Y-axis direction can be set slightly larger than an outer diameter of the first boss 334*b* so as to allow tolerance of the frame 335.

Instead of the hole-shaped engagement portions, a projection to be fitted into a hole shape (recess portion) provided in the bearing member 334 may be provided in the frame 335 to serve as the first engagement portion or the second engagement portion.

The conveyance roller 321 includes a rotation shaft 321*a* extending in the X-axis direction serving as the rotational axis direction and a plurality of rubber rollers 321*b* supported by the rotation shaft 321*a*. The rubber rollers 321*b* are roller bodies that come into contact with the sheet S.

The conveyance roller 321 is rotatably supported by the bearing member 334 by an end portion of the rotation shaft 321*a* in the X-axis direction being engaged with (fitted into) the hole 334*c* of the bearing member 334. Here, a gear (not illustrated) is provided at one end portion of the rotation shaft 321*a* to receive driving force for rotationally driving the conveyance roller 321 from the motor provided in the apparatus body 1A.

Support Configuration of First Conveyance Guide and Feed Roller

Figure 5A:
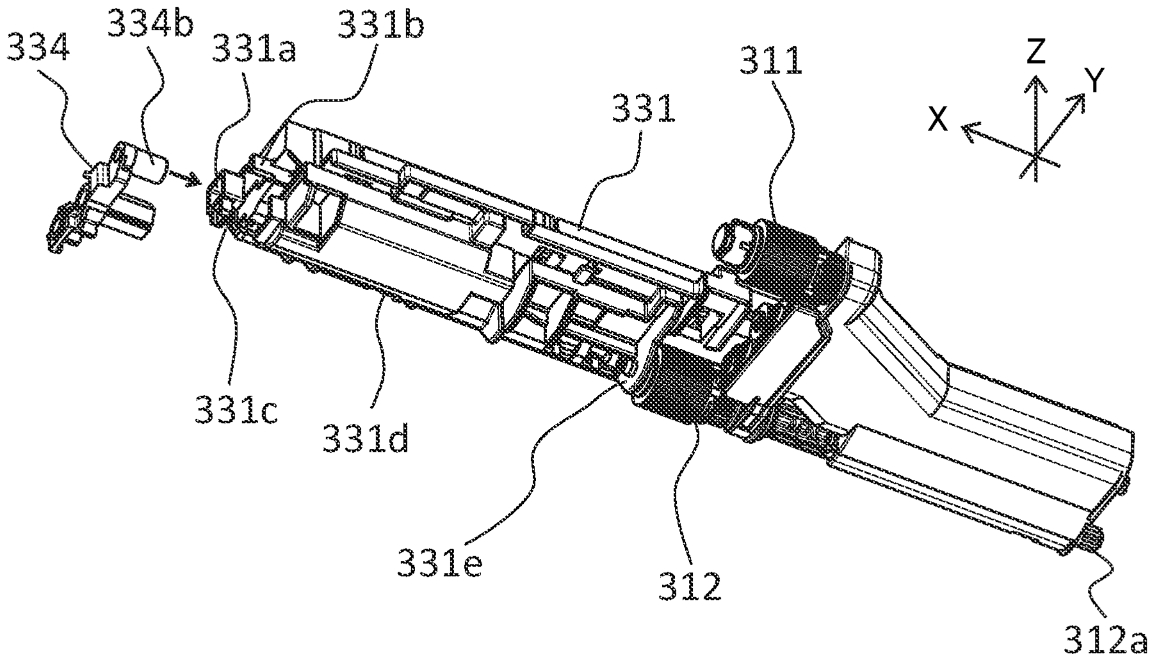
FIGS. 5A and 5B are each a perspective view of a first conveyance guide and a feed roller according to the embodiment.
Figure 5B:
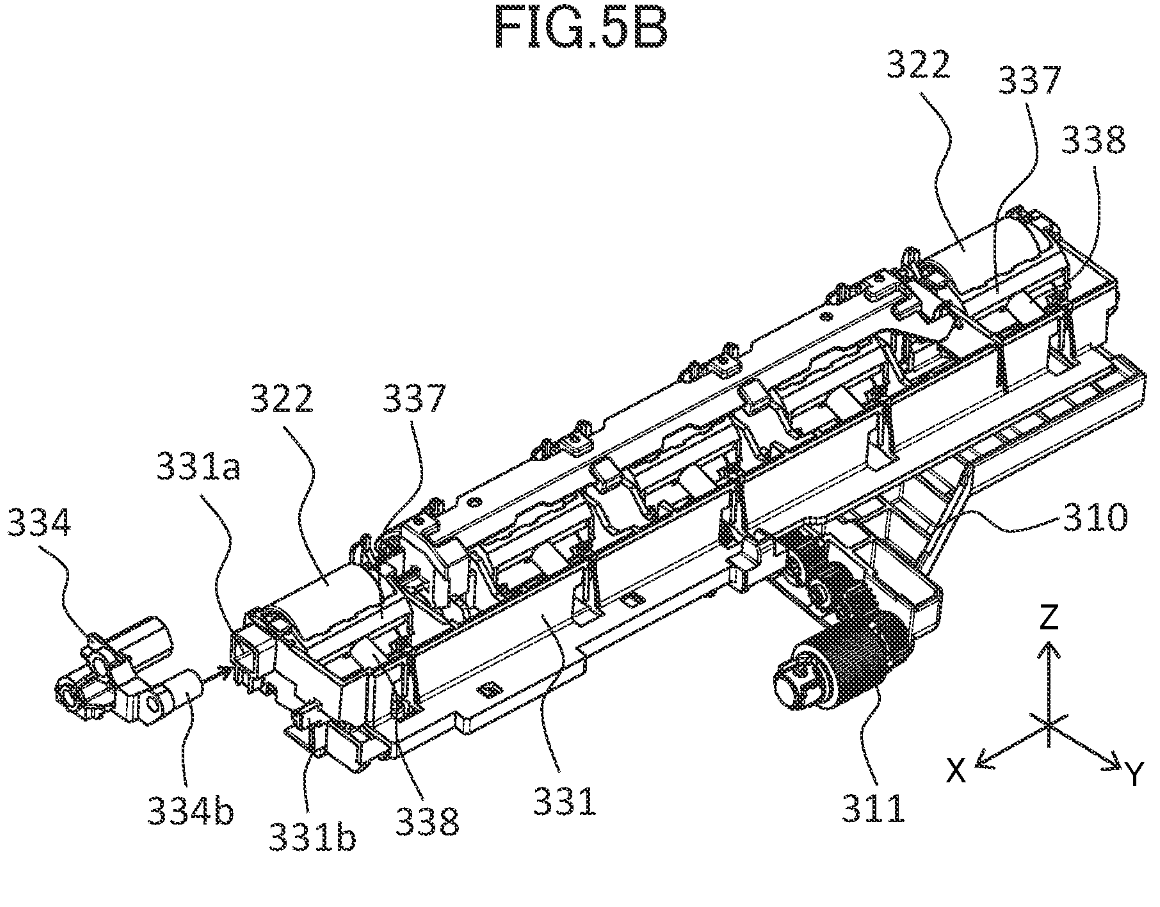
Figure 6:
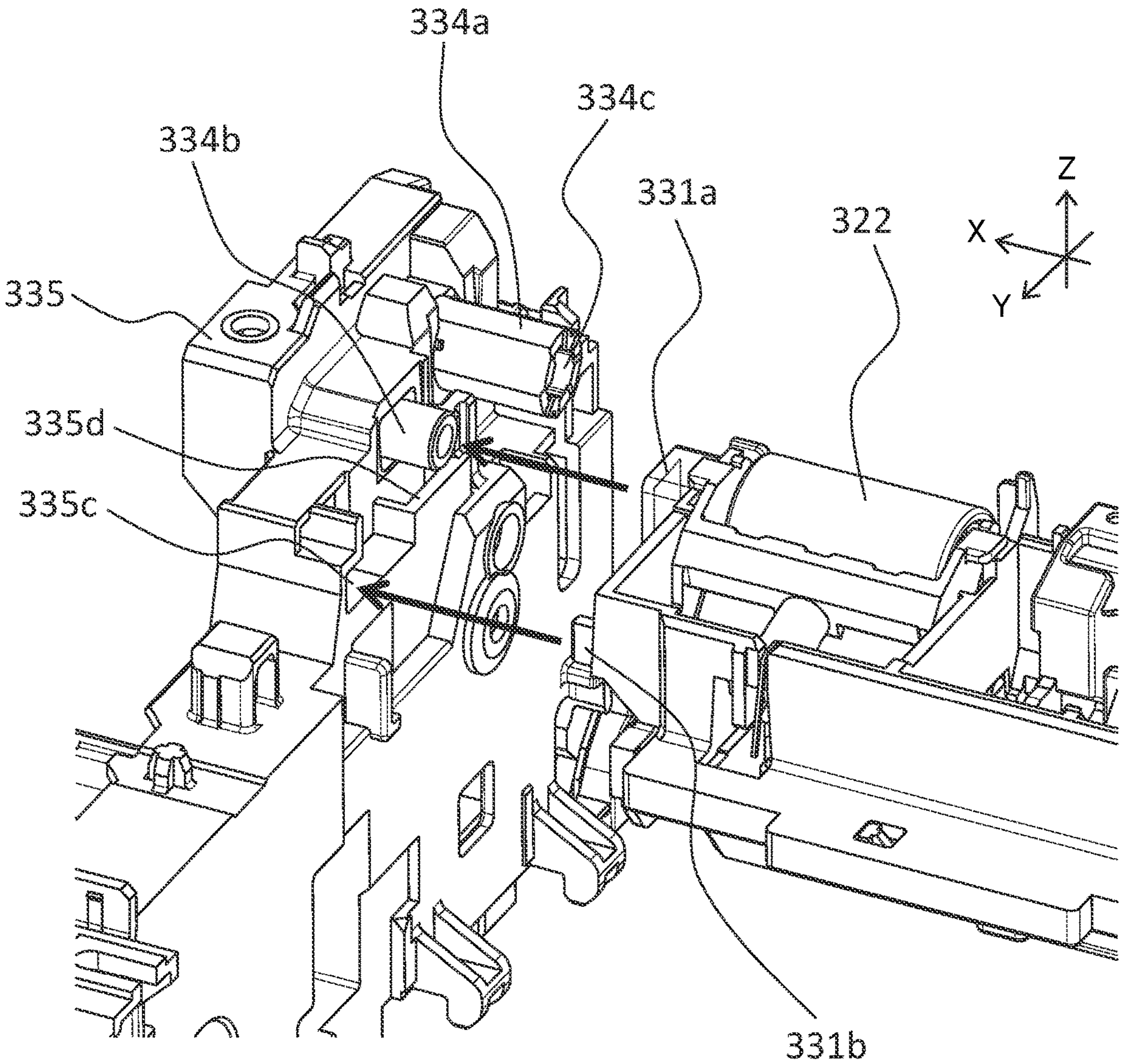
FIG. 6 is a perspective view illustrating a support configuration of the first conveyance guide according to the embodiment.
Figure 7:
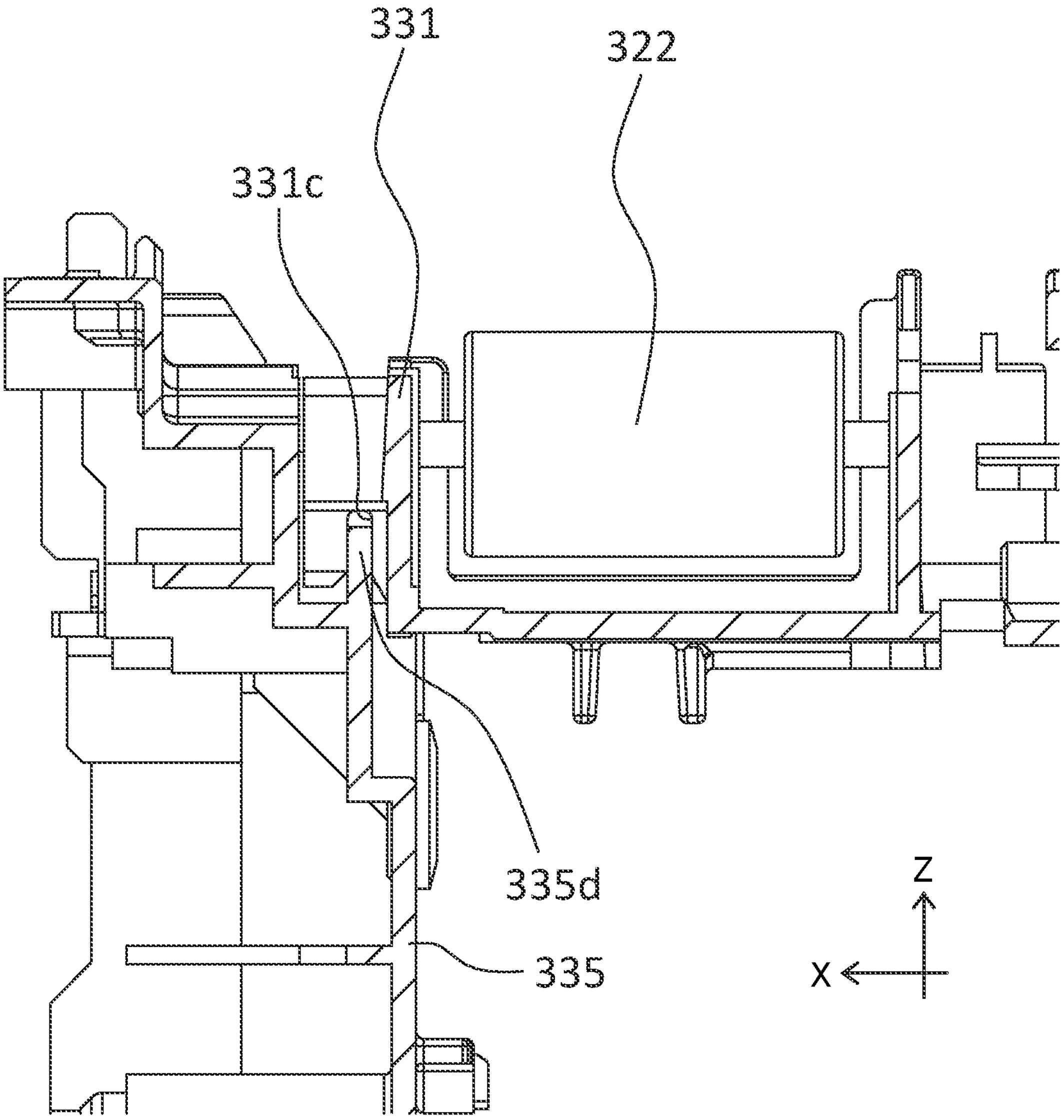
FIG. 7 is a cross-sectional view illustrating a part of the first conveyance guide and a frame according to the embodiment.

A support configuration of the first conveyance guide 331 and the feed roller 312 will be described with reference to FIGS. 5A and 5B to FIG. 7. FIGS. 5A and 5B are perspective views of the first conveyance guide 331 and the feed roller 312 as viewed from different angles. FIG. 6 is a perspective view illustrating the support configuration of the first conveyance guide 331. FIG. 7 is a cross-sectional view of a part of the first conveyance guide 331 and the frame 335, which is taken along a plane perpendicular to the Y-axis direction in a state in which the first conveyance guide 331 is assembled to the image forming apparatus 1.

As illustrated in FIGS. 5A and 5B, the first conveyance guide 331 has a guide portion 331*d* (first guide portion; see also FIG. 2) that forms the first conveyance path P1 and a bearing portion 331*e* that rotatably supports the feed roller 312. The first conveyance guide 331 supports an arm member 310 that rotatably supports the pickup roller 311. The arm member 310 is swingable (rotatable) with respect to the first conveyance guide 331 so as to raise and lower the pickup roller 311. The feed roller 312 and the pickup roller 311 are rotationally driven by transmitting driving force from the motor provided in the apparatus body 1A to a roller shaft 312*a* of the feed roller 312.

As illustrated in FIG. 5B, the first conveyance guide 331 rotatably supports the plurality of counter conveyance rollers 322. Each of the counter conveyance rollers 322 is rotatably held by a holder 337. The holder 337 is supported by the first conveyance guide 331 via a pressing member 338 (elastic member, spring member). The pressing member 338 urges the holder 337 so as to bring the counter conveyance rollers 322 into pressure contact with the conveyance roller 321 in a state in which the first conveyance guide 331 is assembled to the image forming apparatus 1.

As illustrated in FIGS. 5A, 5B, and 6, a rectangular hole 331*a*, a projection 331*b*, and a slit 331*c* are provided at an end portion of the first conveyance guide 331 in the X-axis direction. The rectangular hole 331*a* has a rectangular (preferably square) opening as viewed in the X-axis direction and has a hole shape formed in the X-axis direction. The projection 331*b* has a projecting shape projecting in the X-axis direction. The projection 331*b* of the present embodiment has a rectangular shape elongated in the Z-axis direction as viewed in the X-axis direction (a plate shape of which a thickness direction is the Y-axis direction). The slit 331*c* has a groove shape formed in the direction intersecting the X-axis direction. The slit 331*c* of the present embodiment has a groove shape (see FIG. 7) opening downward in the Z-axis direction and extending in the Z-axis direction and the Y-axis direction.

The rectangular hole 331*a* of the first conveyance guide 331 is engaged with (fitted into) the first boss 334*b* of the bearing member 334, and the projection 331*b* of the first conveyance guide 331 is engaged with (fitted into) the first groove 335*c* of the frame 335. Thus, a position and posture of the first conveyance guide 331 are regulated.

That is, the first conveyance guide 331 is positioned with the first boss 334*b* (first positioning portion) of the bearing member 334 serving as the positioning center (reference) in at least one direction orthogonal to the X-axis direction. The rectangular hole 331*a* and the first boss 334*b* restrict movement of the first conveyance guide 331 with respect to the bearing member 334 in at least one of the Y-axis direction and the Z-axis direction, preferably in any arbitrary direction orthogonal to the X-axis direction. The movement of the first conveyance guide 331 with respect to the bearing member 334 is preferably restricted in a first direction orthogonal to the X-axis direction and a second direction orthogonal to both the X-axis direction and the first direction. In the present embodiment, the movement of the first conveyance guide 331 in the Y-axis direction and/or in the Z-axis direction with respect to the bearing member 334 is restricted. A width and height (lengths of two sides of the rectangle) of the rectangular hole 331*a* are set to be equal to the outer diameter of the first boss 334*b* or slightly larger than the outer diameter of the first boss 334*b* in consideration of tolerance.

The engagement between the projection 331*b* and the first groove 335*c* of the frame 335 restricts rotation (change in posture) of the first conveyance guide 331 about the first boss 334*b*. That is, even if the first conveyance guide 331 attempts to rotate about the first boss 334*b*, the projection 331*b* interferes with a lower surface or upper surface of the first groove 335*c*. Thus, the first conveyance guide 331 does not rotate.

The first positioning portion may be a recess portion into which a boss (projecting portion) provided in the first conveyance guide 331 (first support member) is fitted.

A positioning configuration of the first conveyance guide 331 in the X-axis direction will be described with reference to FIG. 7. Both the slit 331*c* of the first conveyance guide 331 and the first rib 335*d* of the frame 335 extend in the direction intersecting the X-axis direction. A width of the slit 331*c* in the X-axis direction is set to be equal to a width of the first rib 335*d* in the X-axis direction or to be slightly larger than the width of the first rib 335*d* in consideration of tolerance. Therefore, in a state in which the slit 331*c* is engaged with the first rib 335*d*, movement of the first conveyance guide 331 in the X-axis direction with respect to the frame 335 is restricted. That is, the first conveyance guide 331 is positioned in the X-axis direction by the engagement of the slit 331*c* and the first rib 335*d*.

In the positioning configuration of the first conveyance guide 331 in the X-axis direction, a rib (projecting portion) in the direction intersecting the X-axis direction may be formed in the first conveyance guide 331, and a slit (recess portion) to be engaged with the rib may be formed in the frame 335.

Support Configuration of Second Conveyance Guide

Figure 8A:
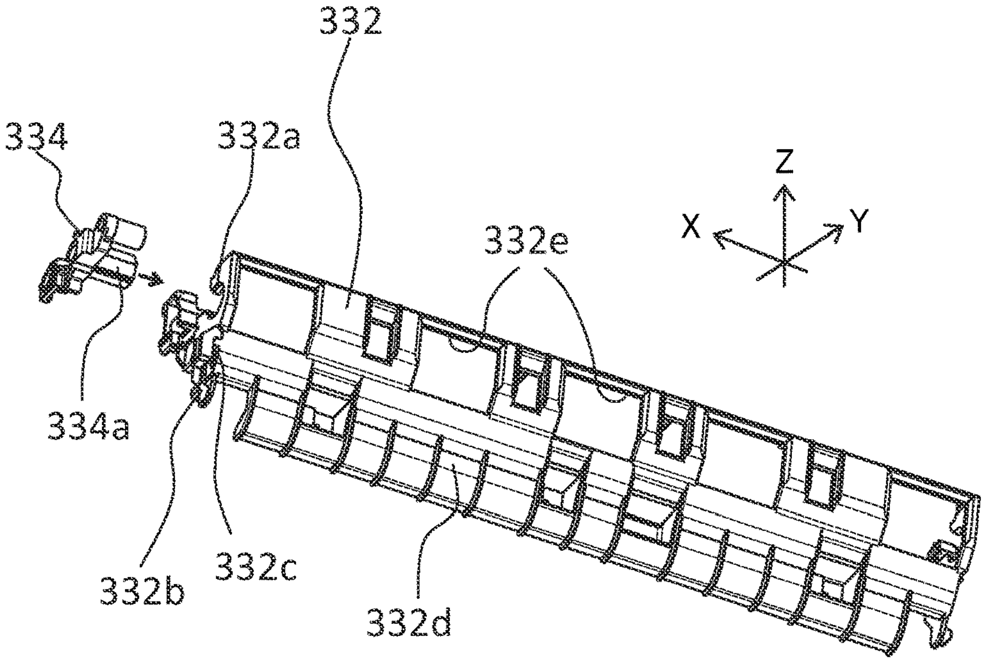
FIGS. 8A and 8B are each a perspective view of a second conveyance guide according to the embodiment.
Figure 8B:
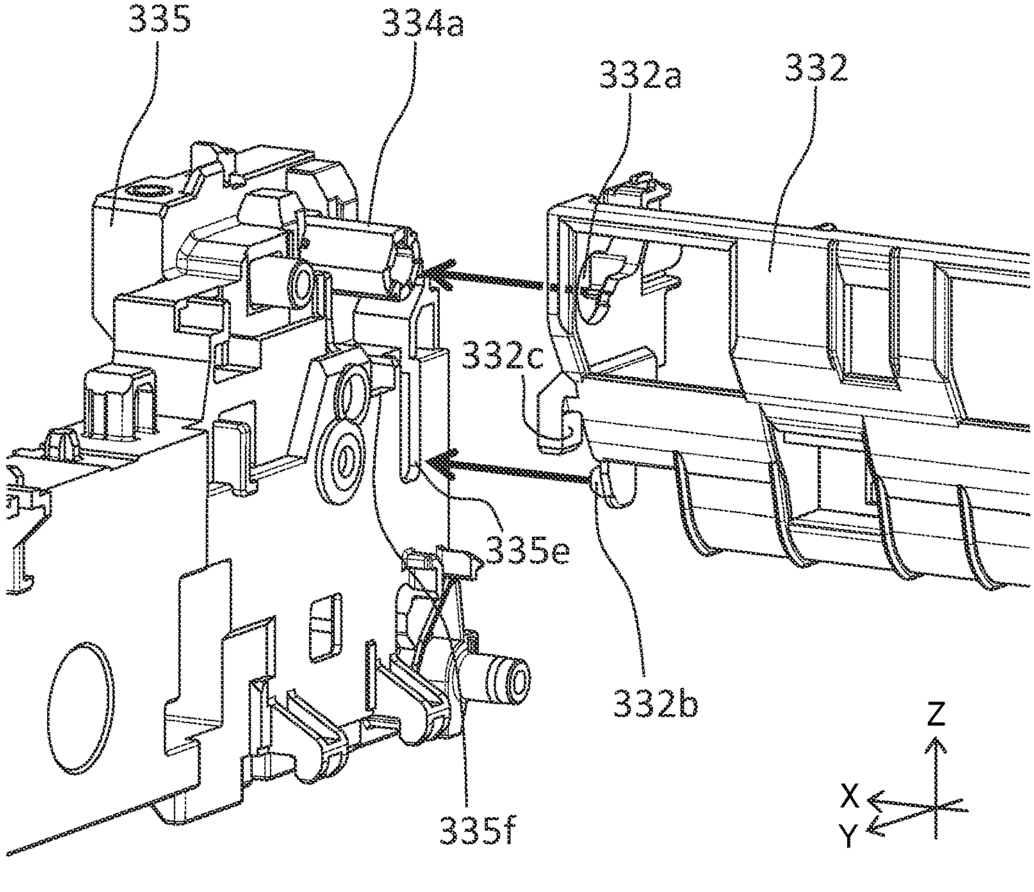
Figure 9:
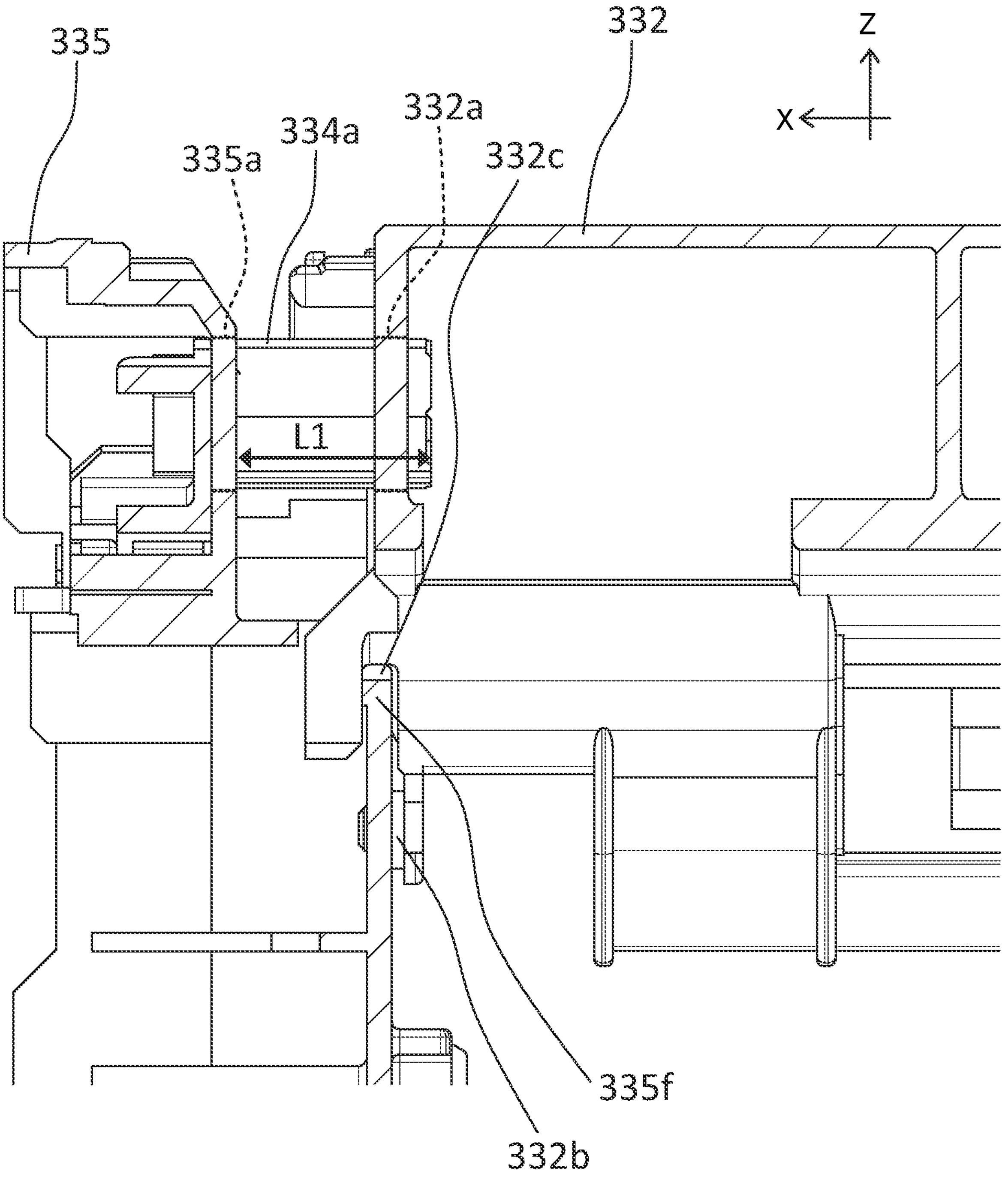
FIG. 9 is a perspective view illustrating a support configuration of the second conveyance guide according to the embodiment.

A support configuration of the second conveyance guide 332 will be described with reference to FIGS. 8A, 8B, and 9. FIG. 8A is a perspective view of the second conveyance guide 332. FIG. 8B is a perspective view illustrating a support configuration of the second conveyance guide 332.

As illustrated in FIG. 8A, the second conveyance guide 332 has a guide portion 332*d* (see also FIG. 2) that forms the first conveyance path P1 and the second conveyance path. The guide portion 332*d* has an opening portion 332*e* for allowing each rubber roller 321*b* of the conveyance roller 321 to project into the first conveyance path P1.

As illustrated in FIG. 8B, a hole 332*a*, a projection 332*b*, and a slit 332*c* are provided at an end portion of the second conveyance guide 332 in the X-axis direction. The hole 332*a* is a through hole penetrating, in the X-axis direction, a side surface of the second conveyance guide 332 in the X-axis direction. The projection 332*b* has a projecting shape projecting outward in the X-axis direction from the side surface of the second conveyance guide 332 in the X-axis direction. The slit 332*c* has a groove shape formed in the direction intersecting the X-axis direction. The slit 332*c* of the present embodiment has a groove shape opening downward in the Z-axis direction and extending in the Z-axis direction and the Y-axis direction.

The hole 332*a* of the second conveyance guide 332 is engaged with (fitted into) the second boss 334*a* of the bearing member 334, and the projection 332*b* of the second conveyance guide 332 is engaged with (fitted into) the second groove 335*e* of the frame 335. Thus, a position and posture of the second conveyance guide 332 are regulated.

That is, the second conveyance guide 332 is positioned with the second boss 334*a* of the bearing member 334 serving as the positioning center (reference) in at least one direction orthogonal to the X-axis direction. The hole 332*a* and the second boss 334*a* restrict movement of the second conveyance guide 332 with respect to the bearing member 334 in at least one of the Y-axis direction and the Z-axis direction, preferably in any arbitrary direction orthogonal to the X-axis direction. The movement of the second conveyance guide 332 with respect to the bearing member 334 is preferably restricted in the first direction orthogonal to the X-axis direction and the second direction orthogonal to both the X-axis direction and the first direction. In the present embodiment, the movement of the second conveyance guide 332 in the Y-axis direction and/or in the Z-axis direction with respect to the bearing member 334 is restricted. An inner diameter of the hole 332*a* is set to be equal to the outer diameter of the second boss 334*a* or to be slightly larger than the outer diameter of the second boss 334*a* in consideration of tolerance.

The engagement between the projection 332*b* and the second groove 335*e* of the frame 335 restricts rotation (change in posture) of the second conveyance guide 332 about the second boss 334*a*. That is, even if the second conveyance guide 332 attempts to rotate about the second boss 334*a*, the projection 332*b* interferes with a side surface (one of side surfaces on both sides in the Y-axis direction) of the second groove 335*e*. Thus, the second conveyance guide 332 does not rotate.

A positioning configuration of the second conveyance guide 332 in the X-axis direction will be described with reference to FIG. 9. Both the slit 332*c* of the second conveyance guide 332 and the second rib 335*f* of the frame 335 extend in the direction intersecting the X-axis direction. A width of the slit 332*c* in the X-axis direction is set to be equal to a width of the second rib 335*f* in the X-axis direction or to be slightly larger than the width of the second rib 335*f* in consideration of tolerance. Therefore, in a state in which the slit 332*c* is engaged with the second rib 335*f*, movement of the second conveyance guide 332 in the X-axis direction with respect to the frame 335 is restricted. That is, the second conveyance guide 332 is positioned in the X-axis direction by the engagement of the slit 332*c* and the second rib 335*f*.

In the positioning configuration of the second conveyance guide 332 in the X-axis direction, a rib (projecting portion) in the direction intersecting the X-axis direction may be formed in the second conveyance guide 332, and a slit (recess portion) to be engaged with the rib may be formed in the frame 335.

Support Configuration of Third Conveyance Guide and Transfer Roller

Figure 10A:
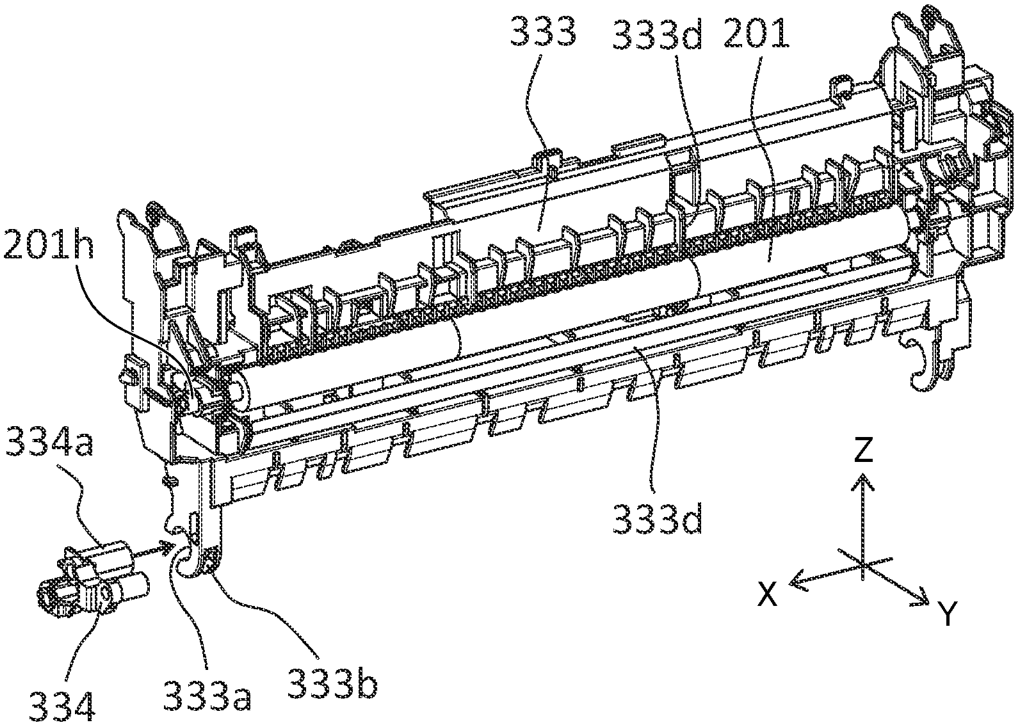
FIG. 10A is a perspective view of a third conveyance guide according to the embodiment.
Figure 10B:
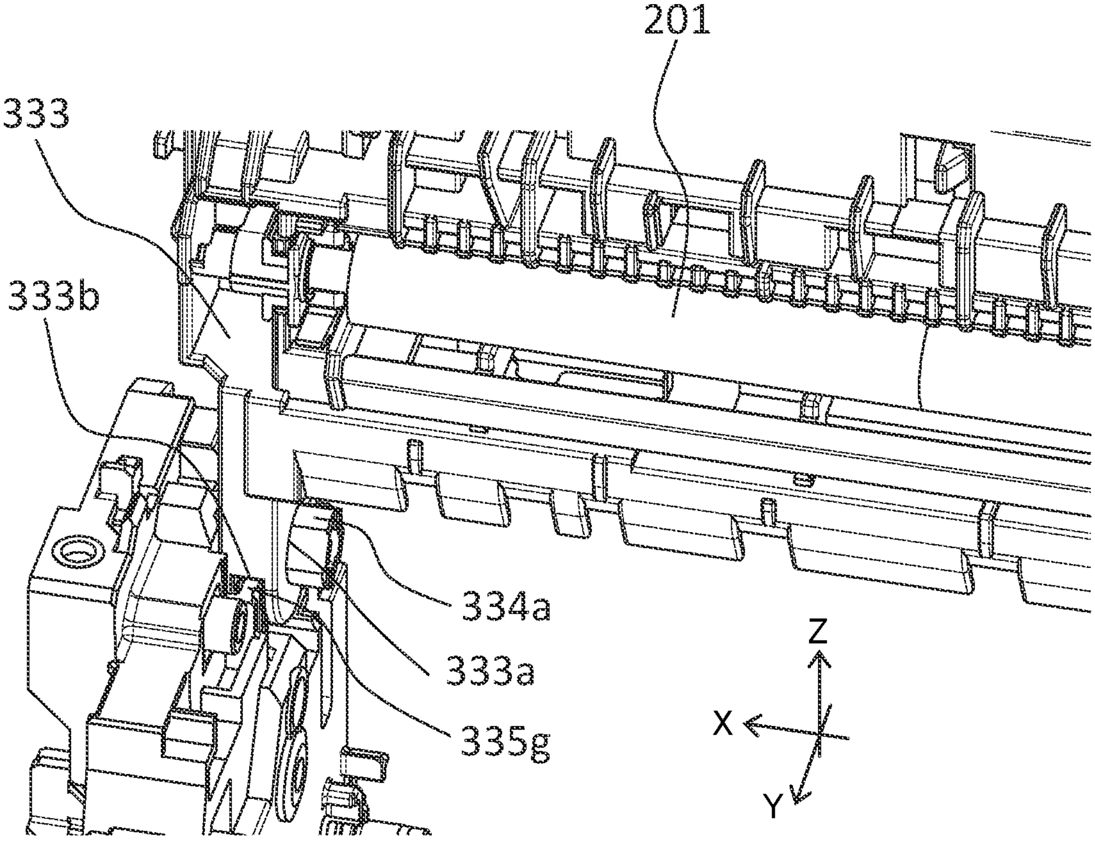
FIG. 10B is a perspective view of a support configuration of the third conveyance guide.

A support configuration of the third conveyance guide 333 and the transfer roller 201 will be described with reference to FIGS. 10A and 10B. FIG. 10A is a perspective view of the third conveyance guide 333. FIG. 10B is a perspective view of the support configuration of the third conveyance guide 333.

As illustrated in FIG. 10A, the third conveyance guide 333 has a guide portion 333*d* (second guide portion; see also FIG. 2) that forms the first conveyance path P1. The third conveyance guide 333 rotatably supports the transfer roller 201. Both end portions of a shaft portion of the transfer roller 201 are rotatably held by a holder 201*h*. The holder 201*h* is supported by the third conveyance guide 333 via a pressing member 201*p* (elastic member, spring member; see FIG. 2). The pressing member 201*p* urges the holder 201*h* so as to bring the transfer roller 201 into pressure contact with the photosensitive drum 111 in a state in which the third conveyance guide 333 is assembled to the image forming apparatus 1.

As illustrated in FIGS. 10A and 10B, a hole 333*a* and a slit 333*b* are provided at an end portion of the third conveyance guide 333 in the X-axis direction. The hole 333*a* is a through hole penetrating, in the X-axis direction, a side surface of the third conveyance guide 333 in the X-axis direction. The slit 333*b* has a groove shape formed in the direction intersecting the X-axis direction. The slit 333*b* of the present embodiment has a groove shape opening downward in the Z-axis direction and extending in the Z-axis direction and the Y-axis direction.

When the hole 333*a* of the third conveyance guide 333 is engaged with (fitted into) the second boss 334*a* of the bearing member 334, a position of the third conveyance guide 333 is regulated.

That is, the third conveyance guide 333 is positioned with the second boss 334*a* (second positioning portion) of the bearing member 334 serving as a positioning center (reference) in at least one direction orthogonal to the X-axis direction. The hole 333*a* and the second boss 334*a* restrict movement of the third conveyance guide 333 with respect to the bearing member 334 in at least one of the Y-axis direction and the Z-axis direction, preferably in any arbitrary direction orthogonal to the X-axis direction. The movement of the third conveyance guide 333 with respect to the bearing member 334 is preferably restricted in the first direction orthogonal to the X-axis direction and the second direction orthogonal to both the X-axis direction and the first direction. In the present embodiment, the movement of the third conveyance guide 333 in the Y-axis direction and/or in the Z-axis direction with respect to the bearing member 334 is restricted. An inner diameter of the hole 333*a* is set to be equal to the outer diameter of the second boss 334*a* or to be slightly larger than the outer diameter of the second boss 334*a* in consideration of tolerance.

The second positioning portion may be a recess portion into which a boss (projecting portion) provided in the third conveyance guide 333 (second support member) is fitted.

Here, the hole 332*a* of the second conveyance guide 332 and the hole 333*a* of the third conveyance guide 333 are engaged with the second boss 334*a* of the bearing member 334 at different positions in the X-axis direction. That is, in the present embodiment, a part of the second boss 334*a* is the second positioning portion that positions the second support member (third conveyance guide), and another part of the second boss 334*a* is the third positioning portion that positions the guide member (second conveyance guide 332). Therefore, a length L1 (FIG. 9) of the second boss 334*a* of the bearing member 334 projecting in the X-axis direction from the hole 335*a* of the frame 335 is at least larger than the sum of lengths of the hole 332*a* of the second conveyance guide 332 and of the hole 333*a* of the third conveyance guide 333 in the X-axis direction.

A positioning configuration of the third conveyance guide 333 in the X-axis direction will be described with reference to FIG. 10B. Both the slit 333*b* of the third conveyance guide 333 and the third rib 335*g* of the frame 335 extend in the direction intersecting the X-axis direction. A width of the slit 333*b* in the X-axis direction is set to be equal to a width of the third rib 335*g* in the X-axis direction or to be slightly larger than the width of the third rib 335*g* in consideration of tolerance. Therefore, in a state in which the slit 333*b* is engaged with the third rib 335*g*, movement of the third conveyance guide 333 in the X-axis direction with respect to the frame 335 is restricted. That is, the third conveyance guide 333 is positioned in the X-axis direction by the engagement of the slit 333*b* and the third rib 335*g*.

Although the third conveyance guide 333 of the present embodiment is positioned in the X-axis, Y-axis, and Z-axis directions as described above, the rotation (change in posture) of the bearing member 334 about the second boss 334*a* is not restricted by the bearing member 334 or the frame 335. That is, the third conveyance guide 333 is supported by the bearing member 334 so as to be rotatable about the second boss 334*a*. Because the third conveyance guide 333 is rotatable, the process unit 110 (or another detachment unit) is easily detached as described below.

The guide portion 333*d* that guides the sheet at the transfer roller 201 and in the vicinity thereof is located downstream of the conveyance roller 321 in the sheet conveyance direction (above the conveyance roller in the Z-axis direction). Therefore, the hole 333*a* and the slit 333*b* of the third conveyance guide 333 are provided at a leading edge of the arm portion projecting upstream (downward) from an upstream end (lower end) of the guide portion 333*d* in the sheet conveyance direction.

Opening and Closing Operation of Third Conveyance Guide

Figure 11A:
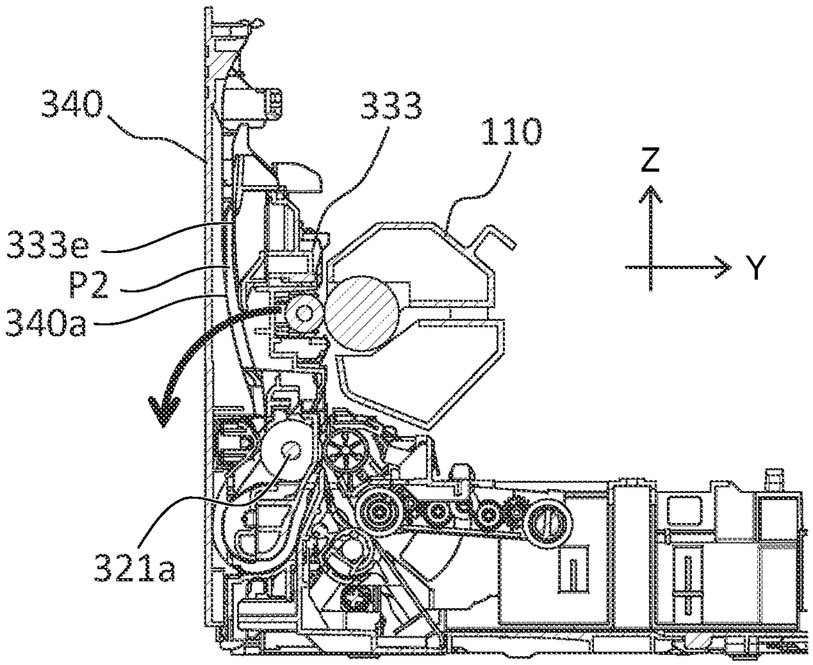
FIG. 11A is a cross-sectional view of the image forming apparatus in a state in which a back cover according to the embodiment is closed.
Figure 11B:
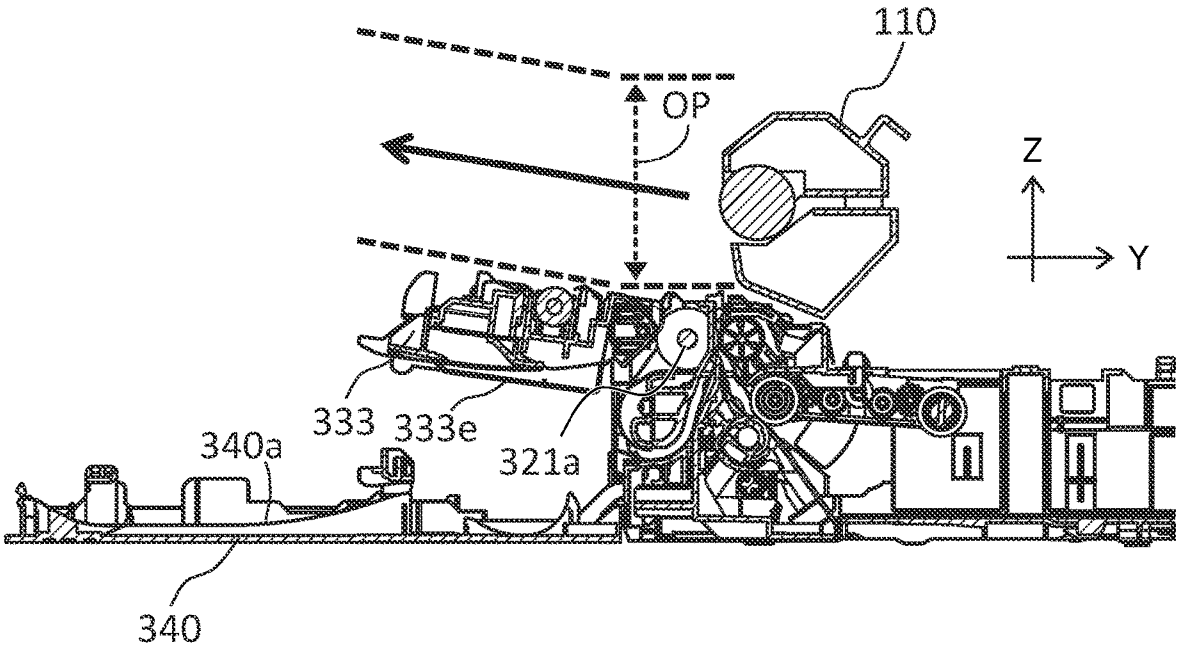
FIG. 11B is a cross-sectional view of the image forming apparatus in a state in which the back cover is open.

As illustrated in FIGS. 11A and 11B, in the present embodiment, the process unit 110 is detachable from a back surface side (one side in the Y-axis direction) of the apparatus body 1A. FIG. 11A illustrates a state in which a back cover 340 is closed, and FIG. 11B illustrates a state in which the back cover 340 is open.

As illustrated in FIGS. 1, 11A, and 11B, the image forming apparatus 1 includes the back cover 340 as an opening/closing member. The apparatus body 1A has an opening portion OP that opens in the Y-axis direction. The back cover 340 is rotatably supported by the apparatus body 1A. The back cover 340 is movable (openable and closable) between a closed position (FIG. 11A) at which the back cover 340 covers the opening portion OP of the apparatus body 1A as viewed in the Y-axis direction and an open position (FIG. 11B) at which the back cover 340 allows the opening portion OP of the apparatus body 1A to be exposed as viewed in the Y-axis direction. The back cover 340 in the closed position forms a side surface of the apparatus body 1A in the Y-axis direction.

As illustrated in FIG. 11A, the back cover 340 and the third conveyance guide 333 have guide portions 340*a* and 333*e* facing each other in a state in which the back cover 340 is located at the closed position. In a state in which the back cover 340 is located at the closed position, the second conveyance path P2 is formed between the guide portions 340*a* and 333*e*. As illustrated in FIG. 11B, when the back cover 340 is moved to the open position, the guide portion 340*a* of the back cover 340 is separated from the guide portion 333*e* of the third conveyance guide 333. Therefore, the second conveyance path P2 is opened, and thus a user can easily remove a sheet jammed in the second conveyance path P2.

The user can rotate (open) the third conveyance guide 333 by opening the back cover 340, then gripping the third conveyance guide 333, and pulling the third conveyance guide in an arrow direction in FIG. 11A. In this operation, the third conveyance guide 333 rotates about the second boss 334*a* (FIG. 10) coaxial with the rotation shaft 321*a* of the conveyance roller 321. In other words, the third conveyance guide 333 and the conveyance roller 321 rotate around one rotational axis.

By opening the third conveyance guide 333, a part of the first conveyance path P1 is opened, and thus it is possible to easily remove a sheet jammed in the first conveyance path P1. When the third conveyance guide 333 is opened, the process unit 110 is exposed as viewed from the outside of the image forming apparatus 1 in the Y-axis direction (FIG. 11B). Therefore, the user can grip the process unit 110 and remove and attach the process unit through the opening portion OP of the apparatus body 1A.

As described above, the third conveyance guide 333 is supported to be rotatable about the second boss 334*a* of the bearing member 334, that is, about the rotation shaft 321*a* of the conveyance roller 321. Hereinafter, it will be described that this configuration enables reduction in size of the image forming apparatus.

In a case where a center of rotation of the third conveyance guide 333 is provided above the rotation shaft 321*a* of the conveyance roller 321, the center of rotation may interfere with a detachment path of the process unit 110 (an area indicated by dotted lines in FIG. 11B) as viewed in the X-axis direction. When a support portion that rotatably supports the third conveyance guide 333 is arranged outside the detachment path of the process unit 110 in the X-axis direction in order to avoid the interference, the size of the image forming apparatus increases in the X-axis direction.

In a case where the center of rotation of the third conveyance guide 333 is provided below the rotation shaft 321*a* of the conveyance roller 321, a rotation path of the third conveyance guide 333 may interfere with the rotation shaft 321*a* of the conveyance roller 321. When the support portion that rotatably supports the third conveyance guide 333 is arranged outside the conveyance roller 321 in the X-axis direction in order to avoid the interference, the size of the image forming apparatus increases in the X-axis direction. Further, when the support portion that rotatably supports the third conveyance guide 333 is arranged below the conveyance roller 321 and on the back surface side (left side in FIG. 11A) thereof in order to avoid the interference, the size of the image forming apparatus increases in the Y-axis direction.

Meanwhile, in the present embodiment, the center of rotation of the third conveyance guide 333 is coaxial with the rotation shaft 321*a* of the conveyance roller 321 in the configuration in which the third conveyance guide 333 is openable. Therefore, it is possible to reduce the size of the image forming apparatus while improving workability of jam handling and detachment of the process unit.

Advantages of the Present Embodiment

According to the present embodiment, the first support member supporting the first roller and the second support member supporting the third roller are both positioned by the bearing member supporting the second roller. That is, the end portion of the first conveyance guide 331 (first support member) supporting the feed roller 312 (first roller) is positioned by the first boss 334*b* (first positioning portion) of the bearing member 334 in a direction orthogonal to the X-axis direction (rotational axis direction of the second roller). Further, the end portion of the third conveyance guide 333 (second support member) supporting the transfer roller 201 (third roller) is positioned by the second boss 334*a* (second positioning portion) of the bearing member 334 in a direction orthogonal to the X-axis direction.

Therefore, accuracy of a relative position between the rotational axis of the second roller and the rotational axis of the first roller can be easily secured, as compared with a case where, for example, the first support member and the second support member are positioned by a member different from the bearing member of the second roller. Further, accuracy of a relative position between the rotational axis of the second roller and the rotational axis of the third roller can be easily secured, as compared with a case where the first support member and the second support member are positioned by a member different from the bearing member 334. Therefore, the configuration of the present embodiment can improve a relative alignment accuracy of the rollers. When the relative alignment accuracy of the rollers is improved, skew and turning of a sheet being conveyed can be reduced. This makes it possible to reduce positional deviation and deformation of an image formed on the sheet.

The bearing member 334 rotatably supports the rotation shaft 321*a* of the conveyance roller 321 (second roller) in the hole 334*c* of the second boss 334*a*. The bearing member 334 positions the second support member (third conveyance guide 333) supporting the third roller (transfer roller 201) by the second boss 334*a* (second positioning portion) provided coaxially with the hole 334*c* on the outer peripheral side of the hole 334*c*. This makes it possible to further improve relative positional accuracy between the second roller and the third roller.

The first support member (first conveyance guide 331) supporting the first roller (feed roller 312) may also be positioned by the second boss 334*a* (second positioning portion) of the bearing member 334. That is, the bearing member preferably has a hole that rotatably supports the rotation shaft of the second roller, and at least one of the first positioning portion and the second positioning portion is preferably provided coaxially with the hole on the outer peripheral side of the hole. This makes it possible to improve relative positional accuracy between the second roller and at least one of the first roller and the third roller.

In the present embodiment, the first conveyance guide 331 serving as the first support member and the third conveyance guide 333 serving as the second support member are guide members having the guide portions 331*d* and 333*d* (first guide portion and second guide portion) for guiding a sheet. The first support member and the second support member, which are two guide members, are positioned by the same bearing member. This makes it possible to improve relative positional accuracy of the guide members and therefore to achieve stable sheet conveyance.

Further, in the present embodiment, the first conveyance guide 331 (first support member) and the second conveyance guide 332 (guide member) facing the guide portion 331*d* of the first conveyance guide 331 are positioned by the bearing member 334. The second conveyance guide 332 (guide member) and the third conveyance guide 333 (second support member) located on the same side as the second conveyance guide 332 with respect to the conveyance path and located downstream of the second conveyance guide 332 in the sheet conveyance direction are positioned by the bearing member 334. Therefore, it is possible to improve accuracy of a width of a gap between the first conveyance guide 331 and the second conveyance guide 332 (a width of the conveyance path in a sheet thickness direction) and therefore to reduce a step between the second conveyance guide 332 and the third conveyance guide 333. Accordingly, further stable sheet conveyance can be achieved.

The frame 335 serving as a restriction member/regulation member includes the first rib 335*d* (first position regulation portion) that regulates the position of the first conveyance guide 331 in the X-axis direction and the third rib 335*g* (second position regulation portion) that regulates the position of the third conveyance guide 333 in the X-axis direction. That is, the positions of the first conveyance guide 331 serving as the first support member and the third conveyance guide 333 serving as the second support member are regulated in the X-axis direction (the rotational axis direction of the second roller) by the same member, i.e., the frame 335. This makes it possible to position the first support member and the second support member in the rotational axis direction of the second roller with a simple configuration.

The frame 335 serving as the restriction member/regulation member has the first groove 335*c* that restricts rotation of the first conveyance guide 331 about the first boss 334*b* (first positioning portion). The frame 335 further has the second groove 335*e* that restricts rotation of the third conveyance guide 333 about the second boss 334*a* (second positioning portion). That is, the rotation of the first conveyance guide 331 serving as the first support member and the third conveyance guide 333 serving as the second support member is restricted by the same member, i.e., the frame 335. This makes it possible to stabilize angles of the first support member and the second support member with a simple configuration.

Modification Example

In the present embodiment, a mode has been described in which both the first support member supporting the first roller and the second support member supporting the third roller are guide members that guide a sheet. The present technology is not limited thereto, and the first support member and the second support member may not have a function of guiding a sheet.

OTHER EXAMPLES

In the present embodiment, the configuration in which the process unit 110 is detachable from the back surface side of the apparatus body 1A has been described as an example of the detachable unit. However, the present technology is not limited thereto. For example, in the image forming apparatus including an intermediate transfer belt, the present technology may be applied to a configuration in which an intermediate transfer belt unit is detachable from the back surface side of the apparatus body 1A.

In the present embodiment, the image forming apparatus including the electrophotographic image forming unit 1B has been described as an example, but the present technology may be applied to an image forming apparatus including an inkjet image forming unit or an offset printing mechanism as the image forming unit.

The present technology is not limited to the image forming apparatus body storing the image forming unit and may be applied to an apparatus used together with the image forming apparatus body in the image forming apparatus. Examples of such an apparatus include an image reading apparatus that reads image information from a document sheet and transmits the image information to an image forming apparatus body and a sheet processing apparatus (finisher) that performs processing such as a binding process on a sheet on which an image has been formed by the image forming apparatus body.

OTHER EMBODIMENTS

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-205729, filed on Dec. 20, 2021, which is hereby incorporated by reference herein in its entirety.

What is claimed is:

1. An image forming apparatus comprising:

a first roller configured to convey a sheet;

a second roller arranged downstream of the first roller in a sheet conveyance direction and configured to convey the sheet, the second roller including a rotation shaft and a roller body supported by the rotation shaft;

a third roller arranged downstream of the second roller in the sheet conveyance direction and configured to convey the sheet;

a first support member configured to rotatably support the first roller;

a second support member configured to rotatably support the third roller;

a bearing member configured to rotatably support an end portion of the rotation shaft in a rotational axis direction of the second roller; and a frame supporting the bearing member, wherein the bearing member includes:

a first positioning portion configured to position an end portion of the first support member in the rotational axis direction with respect to a direction orthogonal to the rotational axis direction; and a second positioning portion configured to position an end portion of the second support member in the rotational axis direction with respect to a direction orthogonal to the rotational axis direction, and wherein at least part of the second roller is arranged on one side of the frame in the rotational axis direction, and the bearing member is arranged on another side of the frame in the rotational axis direction.

2. The image forming apparatus according to claim 1, wherein:

the second positioning portion includes a hole, and the rotation shaft of the second roller is rotatably supported by the hole included in the second positioning portion.

3. The image forming apparatus according to claim 2, wherein the second positioning portion and the hole are coaxially arranged.

4. The image forming apparatus according to claim 1, wherein:

the first support member includes a first guide portion configured to guide the sheet, and the second support member includes a second guide portion configured to guide the sheet.

5. The image forming apparatus according to claim 4, further comprising:

a guide member configured to guide the sheet, wherein the bearing member further includes a third positioning portion configured to position an end portion of the guide member in the rotational axis direction with respect to a direction orthogonal to the rotational axis direction.

6. The image forming apparatus according to claim 5, wherein:

the first guide portion and the guide member face each other across a conveyance path through which the sheet passes, and the second guide portion is arranged on a same side as the guide member with respect to the conveyance path and downstream of the guide member in the sheet conveyance direction.

7. The image forming apparatus according to claim 4, wherein the second support member is rotatable about a rotational axis of the second roller between a position where a conveyance path for the sheet is formed and a position where the conveyance path is open.

8. The image forming apparatus according to claim 1, further comprising:

an apparatus body including an opening portion;

an opening/closing member movable with respect to the apparatus body between a closed position where the opening/closing member covers the opening portion and an open position where the opening/closing member allows the opening portion to be exposed; and a unit attachable to and detachable from the apparatus body, wherein the second support member is rotatable to a position where the unit is allowed to be detached through the opening portion in a state where the opening/closing member is in the open position.

9. The image forming apparatus according to claim 8, wherein the unit includes an image bearing member and at least one process member configured to act on the image bearing member.

10. The image forming apparatus according to claim 1, further comprising:

a first rotation restriction portion configured to restrict rotation of the first support member about the first positioning portion; and a second rotation restriction portion configured to restrict rotation of the second support member about the second positioning portion.

11. The image forming apparatus according to claim 10, wherein the frame includes the first rotation restriction portion and the second rotation restriction portion.

12. The image forming apparatus according to claim 11, wherein:

the frame includes a first engagement portion provided coaxially with the second roller and a second engagement portion provided at a position different from the first engagement portion as viewed in the rotational axis direction, the bearing member is positioned in a direction orthogonal to the rotational axis direction by engagement of the first engagement portion with the bearing member, and rotation of the bearing member as viewed in the rotational axis direction is restricted by engagement of the second engagement portion with the bearing member.

13. The image forming apparatus according to claim 1, further comprising:

a first position regulation portion configured to regulate a position of the first support member in the rotational axis direction; and a second position regulation portion configured to regulate a position of the second support member in the rotational axis direction.

14. The image forming apparatus according to claim 13, wherein the frame includes the first position regulation portion and the second position regulation portion.

15. The image forming apparatus according to claim 14, wherein;

the frame includes a first engagement portion provided coaxially with the second roller and a second engagement portion provided at a position different from the first engagement portion as viewed in the rotational axis direction, the bearing member is positioned in a direction orthogonal to the rotational axis direction by engagement of the first engagement portion with the bearing member, and rotation of the bearing member as viewed in the rotational axis direction is restricted by engagement of the second engagement portion with the bearing member.

16. The image forming apparatus according to claim 1, further comprising:

an image bearing member; and a sheet storage portion configured to store a sheet, wherein the first roller is a feed roller configured to feed the sheet from the sheet storage portion, wherein the third roller is a transfer roller configured to transfer a toner image from the image bearing member to the sheet, and wherein the second roller is a conveyance roller configured to convey the sheet conveyed from the feed roller toward a nip portion between the image bearing member and the transfer roller.

17. The image forming apparatus according to claim 1, further comprising:

a fourth roller arranged in contact with the second roller and configured to nip and convey the sheet together with the second roller, wherein the first support member rotatably supports the fourth roller.

18. The image forming apparatus according to claim 1, wherein the first positioning portion and the second positioning portion engage with the frame.

* * * * *